United States Patent
Kommula et al.

(10) Patent No.: US 10,855,520 B1
(45) Date of Patent: Dec. 1, 2020

(54) UTILIZING UPSTREAM ROUTING OF MULTICAST TRAFFIC FROM REDUNDANT MULTICAST SOURCES TO INCREASE MULTICAST RESILIENCY AND AVAILABILITY

(71) Applicant: Juniper Networks, Inc., Sunnyvale, CA (US)

(72) Inventors: Sunanda Kommula, Cupertino, CA (US); Babu Singarayan, San Jose, CA (US); Jonathan C. Barth, Collegeville, PA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/363,422

(22) Filed: Mar. 25, 2019

(51) Int. Cl.
*H04L 12/24* (2006.01)
*H04L 12/703* (2013.01)
*H04L 12/18* (2006.01)

(52) U.S. Cl.
CPC .......... *H04L 41/0668* (2013.01); *H04L 12/18* (2013.01); *H04L 45/28* (2013.01)

(58) Field of Classification Search
CPC .................................................. H04L 41/0668
See application file for complete search history.

(56) References Cited

U.S. PATENT DOCUMENTS

| | | | | |
|---|---|---|---|---|
| 7,769,885 B1 * | 8/2010 | Kompella | ............... | H04L 45/00 709/238 |
| 2003/0142670 A1 * | 7/2003 | Gould | ................... | H04L 69/161 370/390 |
| 2007/0189193 A1 * | 8/2007 | Previdi | ................... | H04L 45/28 370/256 |
| 2011/0113462 A1 * | 5/2011 | Mao | .................... | H04N 21/6405 725/119 |
| 2014/0003245 A1 * | 1/2014 | Han | ...................... | H04L 47/806 370/236 |
| 2017/0093612 A1 * | 3/2017 | Singh | ................... | H05K 999/99 |
| 2019/0140854 A1 * | 5/2019 | Shah | ..................... | H04L 12/185 |

* cited by examiner

*Primary Examiner* — Edan Orgad
*Assistant Examiner* — Won Tae C Kim
(74) *Attorney, Agent, or Firm* — Harrity & Harrity, LLP

(57) ABSTRACT

A network device selects a primary source for multicast traffic and a secondary source for the multicast traffic, where the multicast traffic is provided to endpoint devices communicating with a network, and where the primary source and the secondary source are redundant sources. The network device provides a first join request that includes information that causes a primary path to be provided from the primary source through the network. The network device provides a second join request that includes information that causes a secondary path to be provided from the secondary source through the network. The network device receives the multicast traffic from the primary source via the primary path and the secondary source via the secondary path, and provides the multicast traffic received from the primary source to the endpoint devices. The network device prevents the multicast traffic received from the secondary source from reaching the endpoint devices.

20 Claims, 13 Drawing Sheets

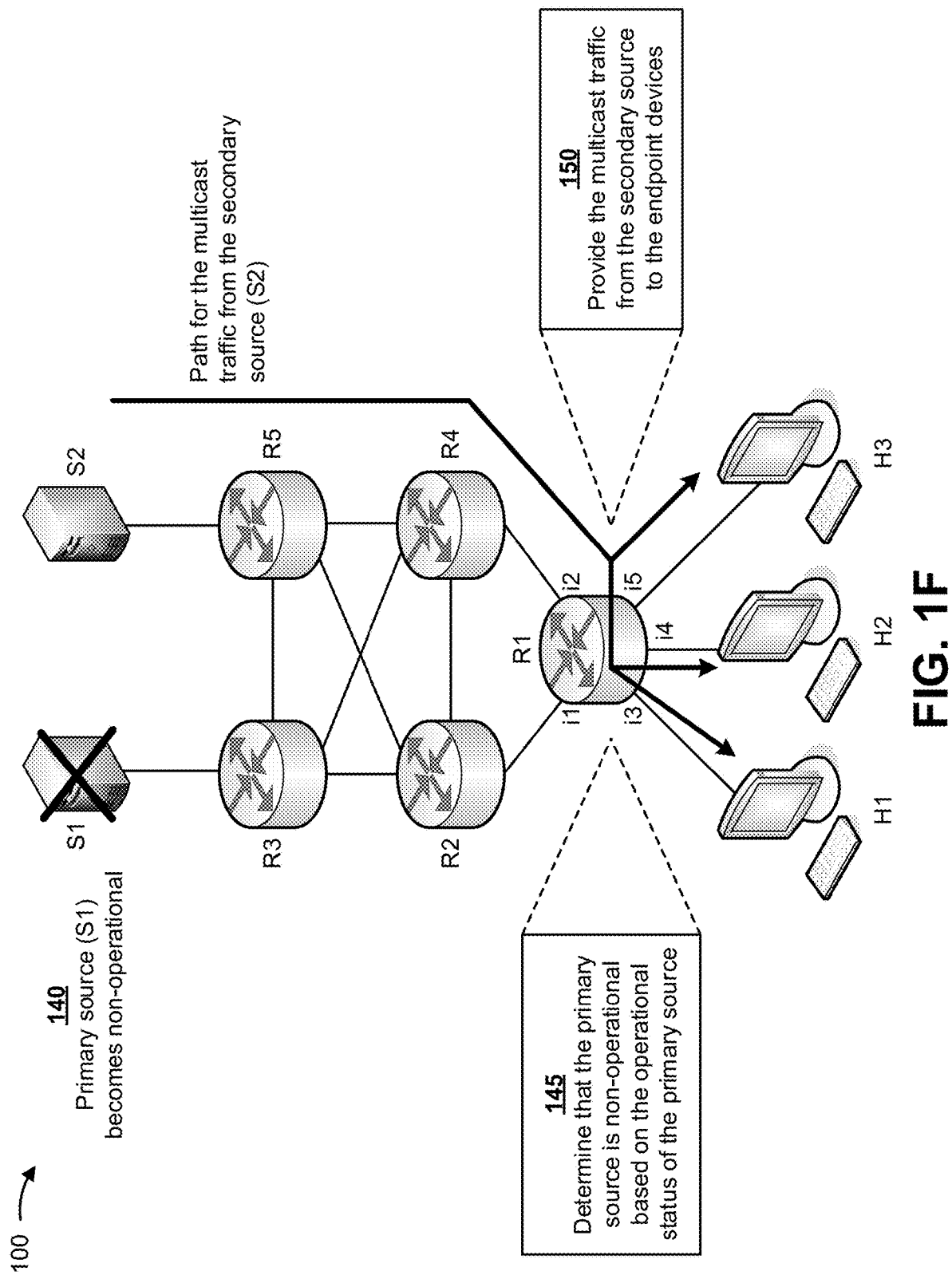

US 10,855,520 B1

UTILIZING UPSTREAM ROUTING OF MULTICAST TRAFFIC FROM REDUNDANT MULTICAST SOURCES TO INCREASE MULTICAST RESILIENCY AND AVAILABILITY

BACKGROUND

In multicast networks where resiliency and high availability are desired, it is typical to have multicast traffic (e.g., content) duplicated and generated from multiple sources (e.g., server devices), such that multicast traffic from a primary source is consumed by the endpoint devices (e.g., hosts) and multicast traffic from the secondary source is blocked before reaching the endpoint devices. Methods used to block traffic from the secondary source include installing filters at discrete points in paths provided between the secondary source and the endpoint devices.

SUMMARY

According to some implementations, a method may include selecting a primary source device for multicast traffic and a secondary source device for the multicast traffic, where the multicast traffic may be provided to one or more endpoint devices communicating with a network, and where the primary source device and the secondary source device may be redundant sources of the multicast traffic. The method may include providing a first join request to the primary source device, where the first join request may include information that causes a primary path to be provided from the primary source device and through the network. The method may include providing a second join request to the secondary source device, where the second join request may include information that causes a secondary path to be provided from the secondary source device and through the network. The method may include receiving the multicast traffic from the primary source device via the primary path, and the secondary source device via the secondary path, and providing the multicast traffic received from the primary source device to the one or more endpoint devices. The method may include preventing the multicast traffic received from the secondary source device from reaching the one or more endpoint devices.

According to some implementations, a network device may include one or more memories, and one or more processors, communicatively coupled to the one or more memories, to select a primary source device for multicast traffic and a secondary source device for the multicast traffic, where the multicast traffic may be provided to one or more endpoint devices communicating with a network, and where the multicast traffic of the primary source device may be redundant of the multicast traffic of the secondary source device. The one or more processors may provide a first join request to the primary source device, where the first join request may include information that causes a primary path to be provided from the primary source device and through the network. The one or more processors may provide a second join request to the secondary source device, where the second join request may include information that causes a secondary path to be provided from the secondary source device and through the network. The one or more processors may receive the multicast traffic from the primary source device via the primary path, and the secondary source device via the secondary path, and may monitor an operational status of the primary source device. The one or more processors may determine that the primary source device is operational based on the operational status of the primary source device and may provide the multicast traffic received from the primary source device to the one or more endpoint devices. The one or more processors may prevent the multicast traffic received from the secondary source device from reaching the one or more endpoint devices.

According to some implementations, a non-transitory computer-readable medium may store instructions that include one or more instructions that, when executed by one or more processors of a network device, may cause the one or more processors to select a primary source device for multicast traffic and a secondary source device for the multicast traffic, where the multicast traffic may be provided to one or more endpoint devices communicating with a network, and where the primary source device and the secondary source device may be redundant sources of the multicast traffic. The one or more instructions may cause the one or more processors to provide a first join request to the primary source device, where the first join request may include information that causes a primary path to be provided from the primary source device and through the network. The one or more instructions may cause the one or more processors to provide a second join request to the secondary source device, where the second join request may include information that causes a secondary path to be provided from the secondary source device and through the network. The one or more instructions may cause the one or more processors to receive the multicast traffic from the primary source device via the primary path, and the secondary source device via the secondary path, and cause the one or more processors to provide the multicast traffic received from the primary source device to the one or more endpoint devices. The one or more instructions may cause the one or more processors to prevent the multicast traffic received from the secondary source device from reaching the one or more endpoint devices and determine that the primary source device is non-operational based on an operational status of the primary source device. The one or more instructions may cause the one or more processors to provide the multicast traffic received from the secondary source device to the one or more endpoint devices based on determining that the primary source device is non-operational.

BRIEF DESCRIPTION OF THE DRAWINGS

FIGS. 1A-1G are diagrams of one or more example implementations described herein.

DETAILED DESCRIPTION

Figure 1A:
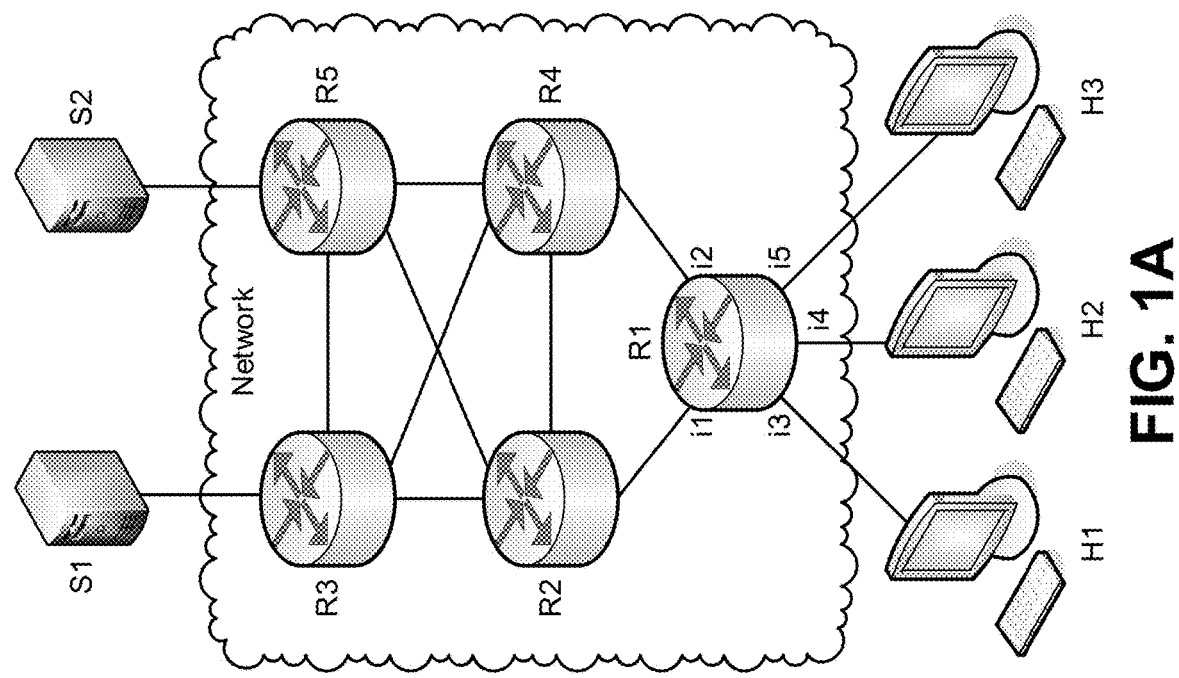

The following detailed description of example implementations refers to the accompanying drawings. The same reference numbers in different drawings may identify the same or similar elements.

An external controller may be used to monitor availability of a primary source of multicast traffic. When the primary source fails, the controller removes filters that were previously blocking the multicast traffic from the secondary source, thus allowing the multicast traffic from the secondary source to reach the end devices.

However, the controller must maintain a mapping of which multicast traffic source is a primary source and which multicast traffic source is a secondary source for a particular multicast group (e.g., for a particular set of endpoint devices). Since this mapping is centralized to the controller, the mapping may be quite large and needs to be highly available. Furthermore, the controller must install the filters at one or more locations of the network (e.g., depending on a topology of the network) to effectively block the multicast traffic from the secondary source. A quantity of the filters may be large when redundancy is required per multicast group. This further adds to the complexity of filter management by the controller and increases a time required for the controller to install the filters in the paths.

In some instances, a path between the secondary source and the endpoint devices may change due to dynamic routing, which requires the controller to be synchronized with routing protocol state changes and to reinstall the filters accordingly. When the primary source fails, a convergence time required for the controller to switch to the secondary source can be significantly delayed due to external detection by the controller across the network. For example, a time required for the controller to detect the primary source failure may depend on a keepalive interval used by the controller and on a repair time by the controller, which includes reconfiguring the filters at one or more network locations (e.g., network devices). If filter add and/or change messages are lost, or filters are installed at incorrect network locations, multicast traffic can become duplicated or lost, which disrupts the multicast services.

Some implementations described herein provide a network device that provides upstream routing of multicast traffic from redundant multicast sources to increase multicast resiliency and availability. For example, the network device may select a primary source device for multicast traffic and a secondary source device for the multicast traffic, where the multicast traffic may be provided to one or more endpoint devices communicating with a network, and where the primary source device and the secondary source device may be redundant sources of the multicast traffic. The network device may provide a first join request to the primary source device, where the first join request may include information that causes a primary path to be provided from the primary source device and through the network. The network device may provide a second join request to the secondary source device, where the second join request may include information that causes a secondary path to be provided from the secondary source device and through the network. The network device may receive the multicast traffic from the primary source device via the primary path, and the secondary source device via the secondary path, and may provide the multicast traffic received from the primary source device to the one or more endpoint devices. The network device may prevent the multicast traffic received from the secondary source device from reaching the one or more endpoint devices.

In this way, multicast traffic may be continuously routed in a multicast network with redundant sources, which reduces or prevents multicast traffic outages in the multicast network (e.g., that cause traffic to be lost, cause traffic to be delayed, require re-routing of traffic, and/or the like). This, in turn, conserves computing resources (e.g., processing resources, memory resources, and/or the like), networking resources, and/or the like that would otherwise be wasted in identifying and/or correcting the traffic outage, re-routing traffic, locating lost traffic, and/or the like.

FIGS. 1A-1G are diagrams of one or more example implementations 100 described herein. As shown in FIG. 1A, endpoint or host devices (e.g., H1, H2, and H3) may be associated with a network and may communicate with and receive multicast traffic from a first source server device (e.g., S1) and/or a second source server device (e.g., S2), via the network. In some implementations, the first source server device (S1) and the second source server device (S2) may be redundant sources of the multicast traffic, such that if one of the first source server device or the second source server device is non-operational, the other of the first source server device or the second source server device may provide the multicast traffic to the endpoint devices. In some implementations, the endpoint devices may be referred to as a multicast group (e.g., G1) that receives multicast traffic from the first source server device or the second source server device.

As further shown in FIG. 1A, the network may include multiple network devices (e.g., routers, gateways, and/or the like), such as a first network device (e.g., R1), a second network device (e.g., R2), a third network device (e.g., R3), a fourth network device (e.g., R4), a fifth network device (e.g., R5), and/or the like. The five network devices shown in FIGS. 1A-1G are provided merely as examples of network devices, and, in practice, the network may include additional network devices. In some implementations, the first network device (R1) may be a last hop network device provided before the endpoint devices.

The first network device may include a first interface (e.g., i1) for communication with the second network device, a second interface (e.g., i2) for communicating with the fourth network device, a third interface (e.g., i3) for communicating with a first endpoint device (H1), a fourth interface (e.g., i4) for communicating with a second endpoint device (H2), a fifth interface (e.g., i5) for communicating with a third endpoint device (H3), and/or the like. The five interfaces shown in FIGS. 1A-1G are provided merely as examples of interfaces, and, in practice, the first network device may include additional interfaces.

Figure 1B:
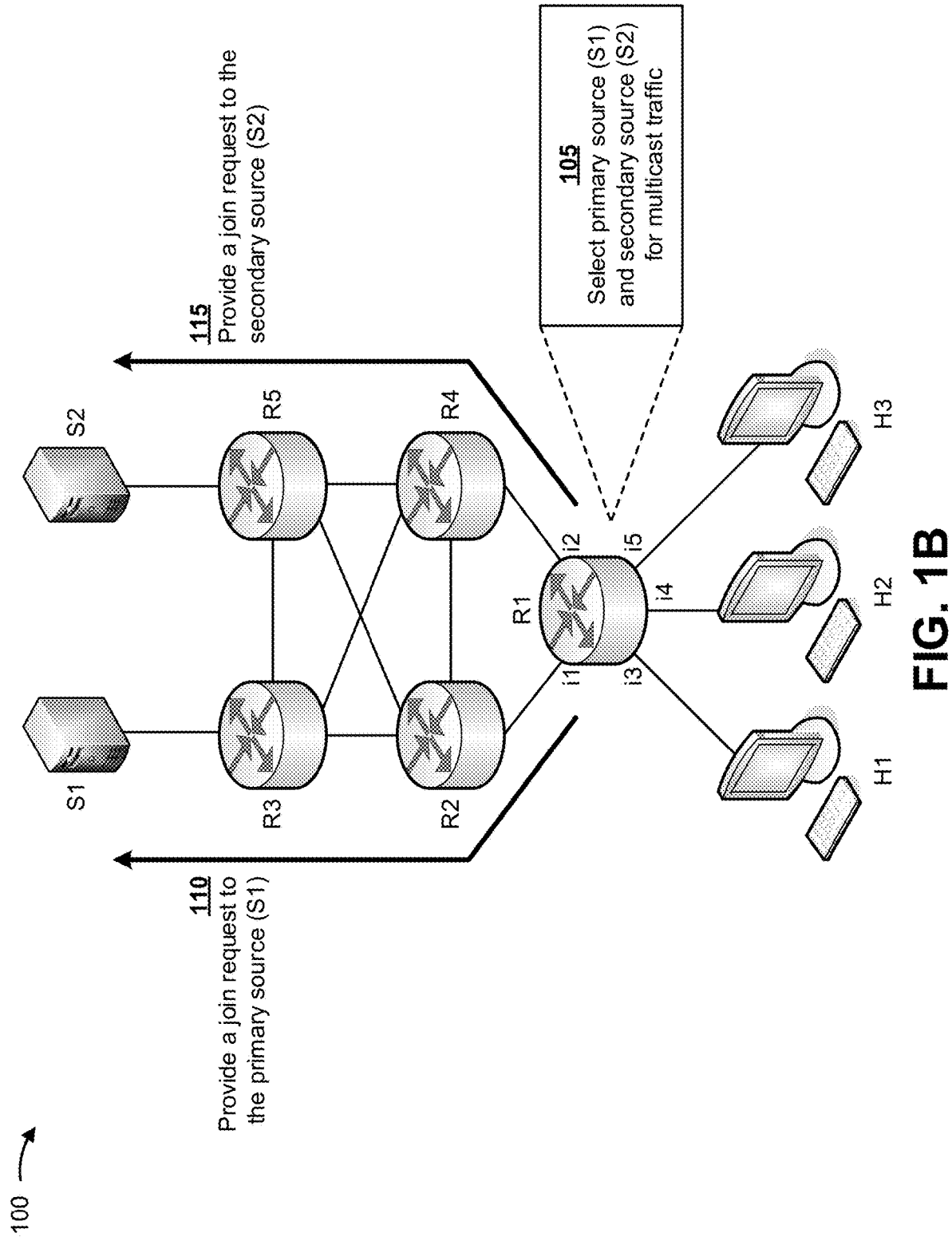

As shown in FIG. 1B, and by reference number 105, the first network device may select the first source server device as a primary source for the multicast traffic and may select the second source server device as a secondary backup source for the multicast traffic. As used herein, the first source server device may be referred to as the primary source, and the second source server device may be referred to as the secondary source. In some implementations, the primary source and the secondary source may provide the multicast traffic to the first network device via one or more of the other network devices of the network.

In some implementations, the first network device may select the primary source and the secondary source as redundant sources of the multicast traffic for a particular group of endpoint devices (e.g., endpoint devices H1, H2, and H3). In some implementations, the first network device may select one or more secondary sources for the particular group of endpoint devices. In such implementations, the first network device may assign priorities to multiple secondary sources based on a preference metric (e.g., availabilities of the multiple secondary sources, load information associated with the multiple secondary sources, path information associated with the multiple secondary sources and the first network device, and/or the like). The first network device may select one or more secondary sources for the multicast traffic, from the multiple secondary sources, based on the priorities assigned to the multiple secondary sources. Based on the selection of the primary source (S1) and the secondary source (S2), the first network device may, for example, be configured as follows:

```
interface i3 {
  static {
    group G1 {
      source S1 primary
      source S2 backup.
```

Based on the selection of the primary source (S1), the first network device may provide a first join request to the primary source, as indicated by reference number 110 in FIG. 1B. Based on the selection of the secondary source (S2), the first network device may provide a second join request to the secondary source, as indicated by reference number 115 in FIG. 1B. In some implementations, the first join request and the second join request may include static Internet group management protocol (IGMP)/multicast listener discovery (MLD) source-specific join requests.

In some implementations, the first network device may utilize a protocol independent multicast source-specific mode (PIM-SSM) to send the first join request to the primary source and the second join request to the secondary source, for the group of endpoint devices. In some implementations, the first join request may result in a source-specific shortest path from the primary source to the first network device, and the second join request may result in a source-specific shortest path from the secondary source to the first network device.

Figure 1C:
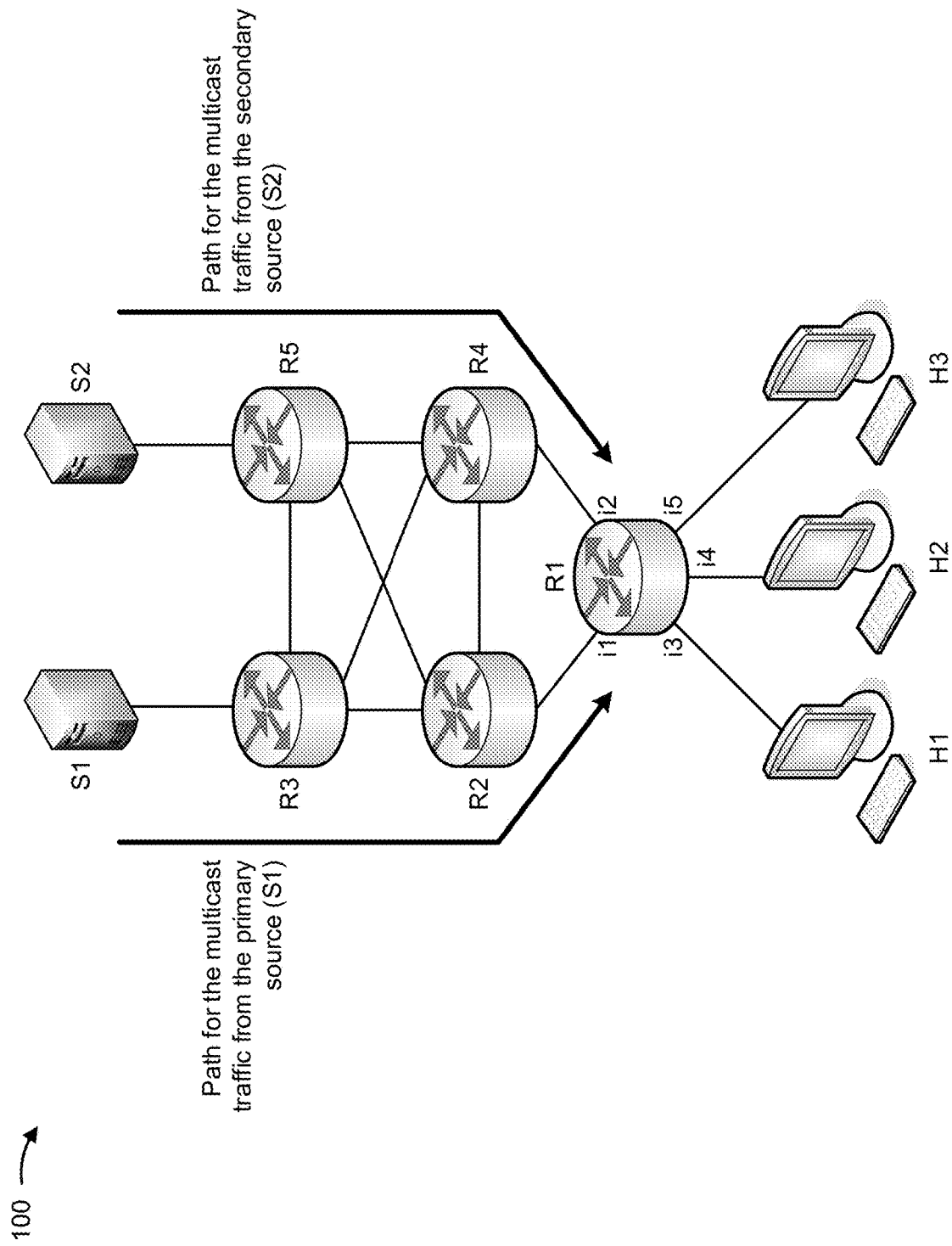

For example, as shown in FIG. 1C, the first join request may generate a first path (or primary path) for the multicast traffic from the primary source to the first network device. In other words, the multicast traffic may traverse the first path from the primary source (S1) to the third network device (R3), the second network device (R2), and the first network device (R1). As further shown in FIG. 1C, the second join request may generate a second path (or secondary path) for the multicast traffic from the secondary source to the first network device. In other words, the multicast traffic may traverse the second path from the secondary source (S2) to the fifth network device (R5), the fourth network device (R4), and the first network device (R1). In one example, the first network device may manage the following paths for the multicast traffic for the group endpoint devices (G1):

(S1, G1) has RPF-interface i1, and OIF list i3, i4, i5

(S2, G1) has RPF-interface i2, and OIF list i3, i4, i5, where "RPF" indicates reverse path forwarding and "OIF" indicates outgoing interface.

Figure 1D:
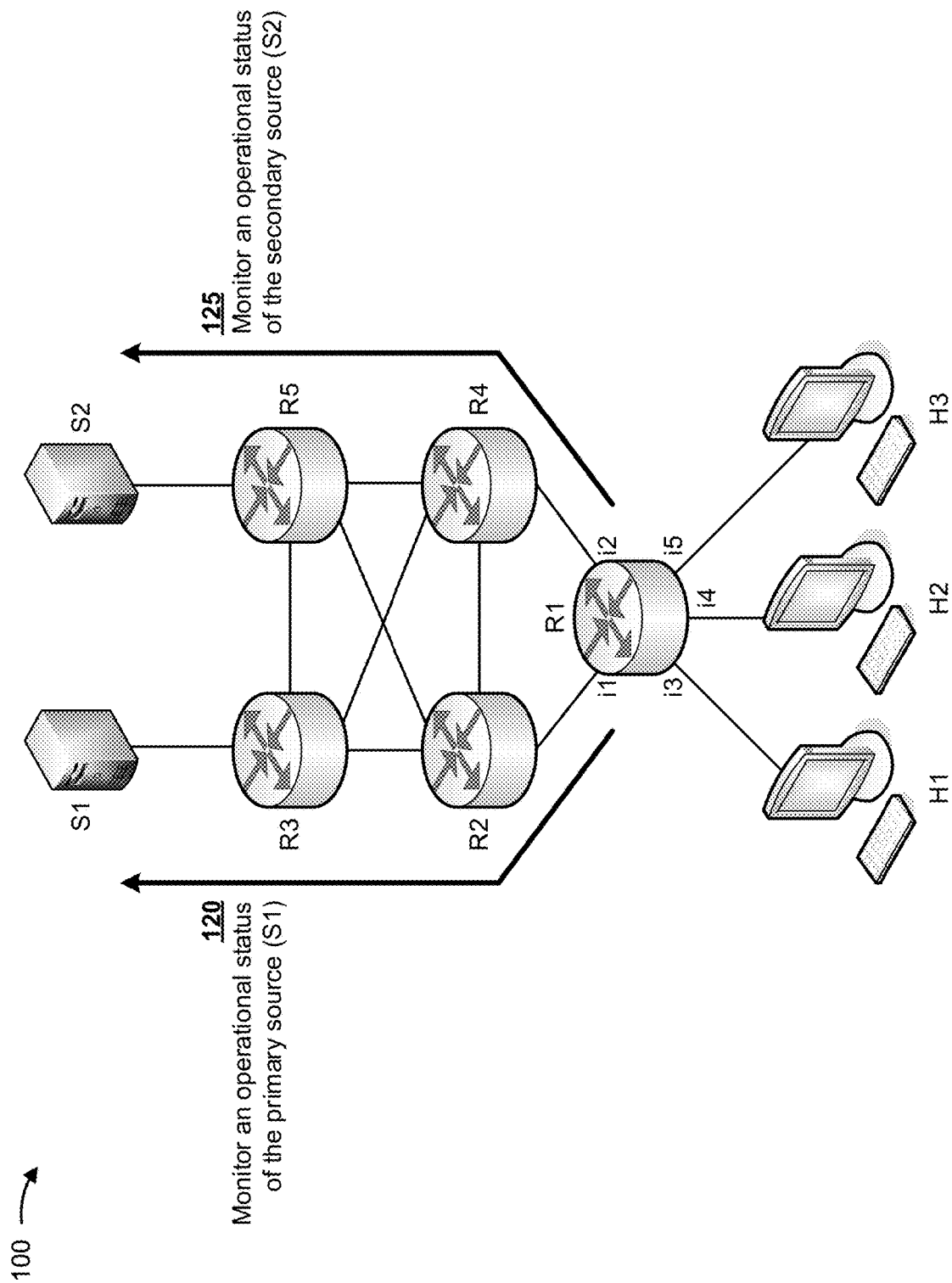

As shown in FIG. 1D, and by reference number 120, the first network device may monitor an operational status of the primary source. As further shown in FIG. 1D, and by reference number 125, the first network device may monitor an operational status of the secondary source. In some implementations, the first network device may monitor the operational statuses of the primary source and the secondary source to ensure that the multicast traffic is available to the endpoint devices.

In some implementations, the first network device may monitor the operational statuses of the primary source and the secondary source using bidirectional forwarding detection (BFD) keepalives; using interior gateway protocol (IGP) keepalives, such as intermediate system to intermediate system (ISIS) or open shortest path first (OSPF) keepalives; monitoring statistics for the multicast traffic; and/or the like. In some implementations, the first network device may associate a source address, for the primary source or the secondary source, with a session identifier (e.g., a 32-bit integer "session-id" value) that uniquely represents a state of the primary source or the secondary source. The first network device may utilize the keepalive protocol to monitor both the primary source and the secondary source and to determine whether corresponding sources (e.g., indicated by the session identifier) are operational (e.g., "up") or non-operational (e.g., "down"). For example, the primary source (S1) may include a session-id of "100" and the secondary source (S2) may include a session-id of "200." When the primary source (S1) and the secondary source (S2) are operational, the following may indicate states of the sources: S1 has session-id 100 (up) and S2 has session-id 200 (up).

In some implementations, the multicast traffic may include the session-id of the primary source. This may bind the multicast traffic and the session-id together and may enable the first network device to respond to events (e.g., a non-operational status of the primary source) quickly. For example, the multicast traffic may include information indicating that (S1, G1) is the primary and that (S2, G1) has primary session-id 100. If there are other groups of endpoint devices using the primary source and the secondary source, the multicast traffic may include information indicating that:

(S1, G2) is the primary (S2, G2) has primary session-id 100

(S1, G3) is the primary (S2, G3) has primary session-id 100.

Figure 1E:
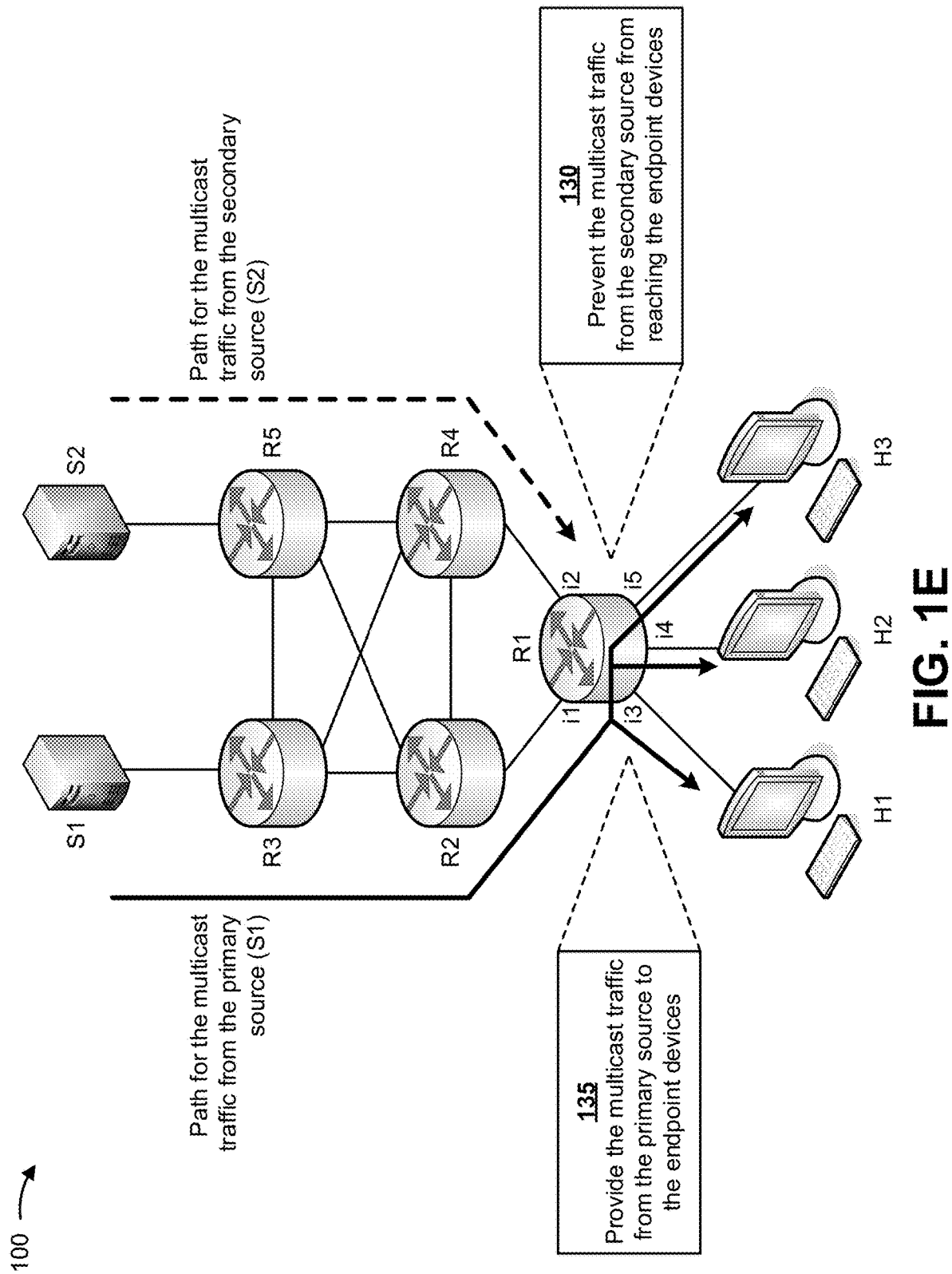

Since the first network device sends join requests to multiple sources (e.g., the primary source and the secondary source), the first network device receives duplicate multicast traffic from both the primary source and the secondary source. Thus, the first network device needs to prevent multicast traffic duplication at the endpoint devices. As shown in FIG. 1E, and by reference number 130, the first network device may prevent the multicast traffic received from the secondary source (e.g., via the secondary path) from reaching the endpoint devices. In some implementations, the first network device may utilize a reverse path forwarding (RPF) check to prevent the multicast traffic received from the secondary source from reaching the endpoint devices. For example, the first network device may program the secondary path with a particular RPF interface (e.g., a "dummy" RPF interface), and may determine that the multicast traffic received from the secondary source device fails the RPF check based on the particular RPF interface. The first network device may prevent the multicast traffic received from the secondary source device from reaching the endpoint devices based on the multicast traffic received from the secondary source device failing the RPF check.

In one example, the secondary path (e.g., S2, G1) may utilize RPF interface i2 of the first network device but may be programmed with a dummy RPF interface "xx." Since the multicast traffic from the secondary source ingresses the first network device on interface i2 and the secondary path is programmed with the RPF interface "xx," the multicast traffic from the secondary source fails the RPF check and gets dropped at interface i2 of the first network device, as shown in FIG. 1E. For example, the primary path may be programmed as (S1, G1) has rpf-interface i1, and OIF list i3, i4, i5, and the secondary path may be programmed as (S2, G1) has rpf-interface xx, and OIF list i3, i4, i5.

In some implementations, the secondary sources for other groups of endpoint devices (e.g., other than endpoint devices H1, H2, and H3), with the primary source (S1), may include a same state. For example, a secondary path for a group (G2) of endpoint devices may be programmed as (S2, G2) has rpf-interface xx, and OIF list i3, a secondary path for a group (G3) of endpoint devices may be programmed as (S2, G3) has rpf-interface xx, and OIF list i4, i5, and/or the like.

In some implementations, the first network device may prevent the multicast traffic received from the secondary source device from reaching the endpoint devices without filters being provided anywhere in the network. In some implementations, the first network device may prevent the multicast traffic received from the secondary source device from reaching the endpoint devices based on utilizing multicast routing constructs, intelligent binding of interfaces, utilizing the RPF check, and/or the like.

As shown in FIG. 1F, and by reference number 140, the primary source may become non-operational and no longer provide the multicast traffic to the first network device via the primary path. In some implementations, the primary source may become non-operational due to a power failure of the primary source, an overloading of the primary source, and/or the like.

As further shown in FIG. 1F, and by reference number 145, the first network device may determine that the primary source is non-operational based on the non-operational status of the primary source. In some implementations, the non-operational status of the primary source may be received by the first network device based on the first network device monitoring the operational status of the primary source using BFD keepalives, using IGP keepalives (e.g., ISIS or OSPF keepalives), monitoring statistics for the multicast traffic, and/or the like. For example, when the primary source becomes non-operational, the keepalive protocol on the first network device may trigger a session-down event for the primary source.

As further shown in FIG. 1F, and by reference number 150, the first network device may provide the multicast traffic from the secondary source to the endpoint devices based on the primary source becoming non-operational. When the primary source becomes non-operational, the first network device may utilize the information provided in the second join request to identify the secondary path for the multicast traffic (e.g., which is on standby for the non-operational primary source). The first network device may reprogram the secondary path with an original RPF interface based on determining that the primary source is non-operational and may determine that the multicast traffic received from the secondary source passes the RPF check based on the original RPF interface. The first network device may provide the multicast traffic received from the secondary source to the endpoint devices based on the multicast traffic received from the secondary source device passing the RPF check. In some implementations, the first network device may program the primary path with the "dummy" RPF interface, as described above in connection with FIG. 1E, to prevent any residual traffic from the primary source (although non-operational) from reaching the endpoint devices.

For example, when the keepalive protocol detects that the primary source (S1) is non-operational, the keepalive protocol may trigger a "down" event for session-id 100. The first network device may analyze routes that are linked with session-id 100, including the secondary path (e.g., (S2, G1)), and may update the routes with an actual RPF interface. This may cause the multicast traffic from the secondary source (S2) to no longer be blocked at interface i2 and to be provided to the endpoint devices associated with group G1. In one example, the secondary path for the group (G1) of endpoint devices may be reprogrammed as (S2, G1) has rpf-interface i2, and OIF list i3, i4, i5, the secondary path for the group (G2) of endpoint devices may be reprogrammed as (S2, G2) has rpf-interface i2, and OIF list i3, and the secondary path for the group (G3) of endpoint devices may be reprogrammed as (S2, G3) has rpf-interface i2, and OIF list i4, i5. In this way, the first network device may enable the multicast traffic to be continuously provided to the groups of endpoint devices when the primary source becomes non-operational.

Figure 1G:
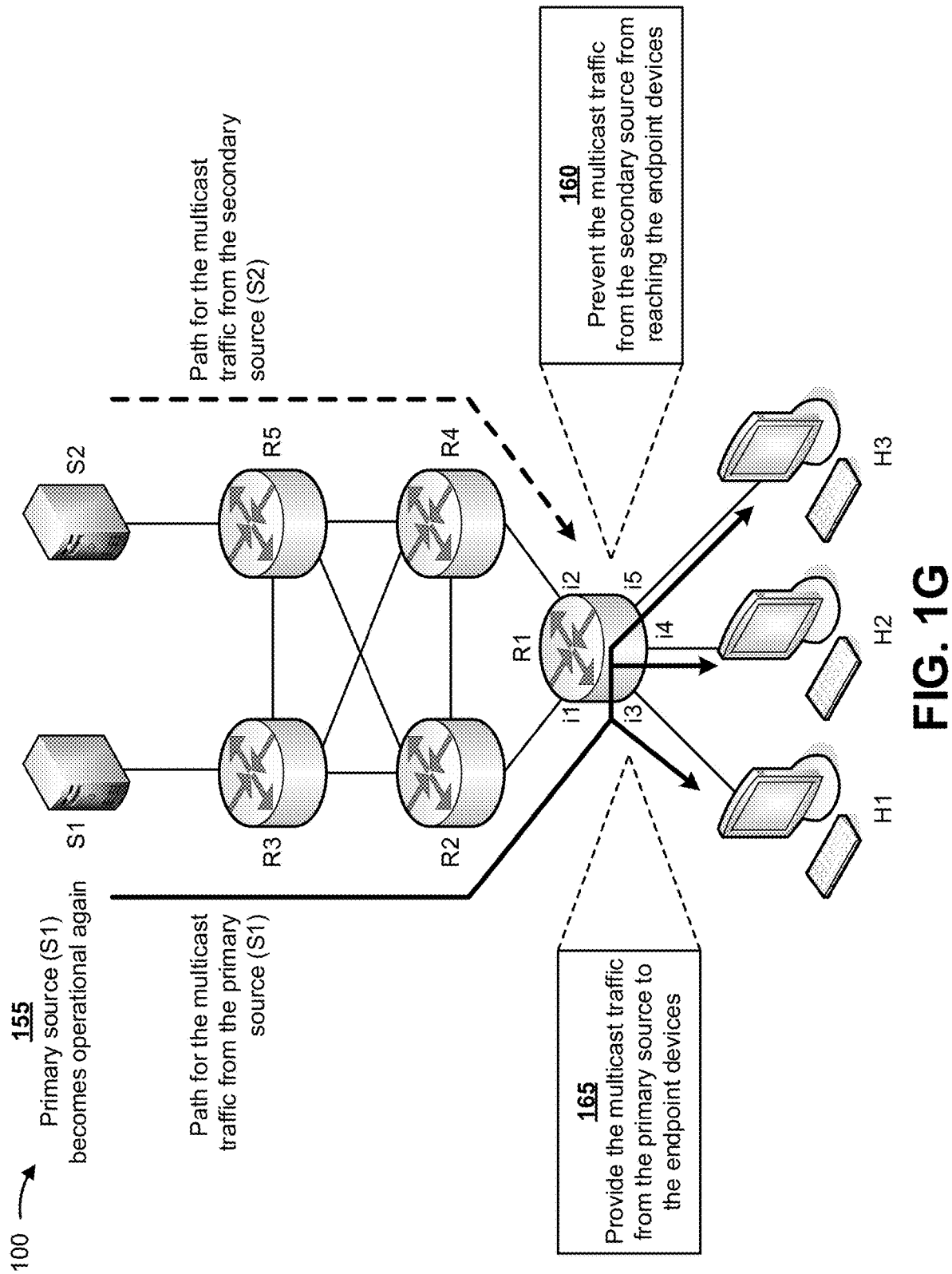

As shown in FIG. 1G, and by reference number 155, the primary source may become operational again (e.g., after being repaired) and provide the multicast traffic to the first network device via the primary path again. In some implementations, the first network device may determine that the primary source is operational based on the operational status of the primary source. The operational status of the primary source may be received by the first network device based on the first network device monitoring the operational status of the primary source using BFD keepalives, using IGP keepalives (e.g., ISIS or OSPF keepalives), monitoring statistics for the multicast traffic, and/or the like. For example, when the primary source becomes operational, the keepalive protocol on the first network device may trigger a session-up event for the primary source.

As further shown in FIG. 1G, and by reference number 160, the first network device may prevent the multicast traffic received from the secondary source (e.g., via the secondary path) from reaching the endpoint devices based on determining that the primary source is operational again. In some implementations, the first network device may utilize the RPF check to prevent the multicast traffic received from the secondary source from reaching the endpoint devices. For example, the first network device may program the secondary path with the particular RPF interface (e.g., the "dummy" RPF interface), and may determine that the multicast traffic received from the secondary source device fails the RPF check based on the particular RPF interface. The first network device may prevent the multicast traffic received from the secondary source device from reaching the endpoint devices based on the multicast traffic received from the secondary source device failing the RPF check.

As further shown in FIG. 1G, and by reference number 165, the first network device may provide the multicast traffic from the primary source to the endpoint devices based on the primary source becoming operational. When the primary source becomes operational again, the first network device may utilize the information provided in the first join request to identify the primary path for the multicast traffic. The first network device may reprogram the primary path with an original RPF interface based on determining that the primary source is operational and may determine that the multicast traffic received from the primary source passes the RPF check based on the original RPF interface. The first network device may provide the multicast traffic received from the primary source to the endpoint devices based on the multicast traffic received from the primary source device passing the RPF check.

In some implementations, the first network device may perform the functions described herein as a security measure for unicast traffic and multicast traffic. In unicast-RPF, if a source of the unicast traffic is determined to be an attack source (e.g., a malicious source of the multicast traffic), the first network device may quickly block the attack source without filters being provided in the network and without changing routing tables. In some implementations, the functions performed by the first network device, as described herein, may reduce convergence time for the multicast traffic. In some implementations, the first network device may utilize the RPF mechanism in a new manner by changing data-path and forwarding functionalities. Thus, functionality of a centralized controller may be moved to multiple locations of the network (e.g., multiple network devices), using local detection and repair, which minimizes points of failure and improves the convergence time.

In this way, multicast traffic may be continuously routed in through a network and to endpoint devices, which reduces or prevents multicast traffic outages in the network (e.g., that cause the multicast traffic to be lost, cause the multicast traffic to be delayed, require re-routing of multicast traffic, and/or the like). This conserves computing resources (e.g., processing resources, memory resources, and/or the like), networking resources, and/or the like that would otherwise be wasted in identifying and/or correcting the multicast traffic outage, re-routing multicast traffic, locating lost multicast traffic, and/or the like. Furthermore, implementations described herein use a rigorous, computerized process to perform tasks that were not previously performed. For example, currently there does not exist a technique that utilizes upstream routing of multicast traffic from redundant multicast sources to increase multicast resiliency and availability.

As indicated above, FIGS. 1A-1G are provided merely as examples. Other examples may differ from what is described with regard to FIGS. 1A-1G.

Figure 2:
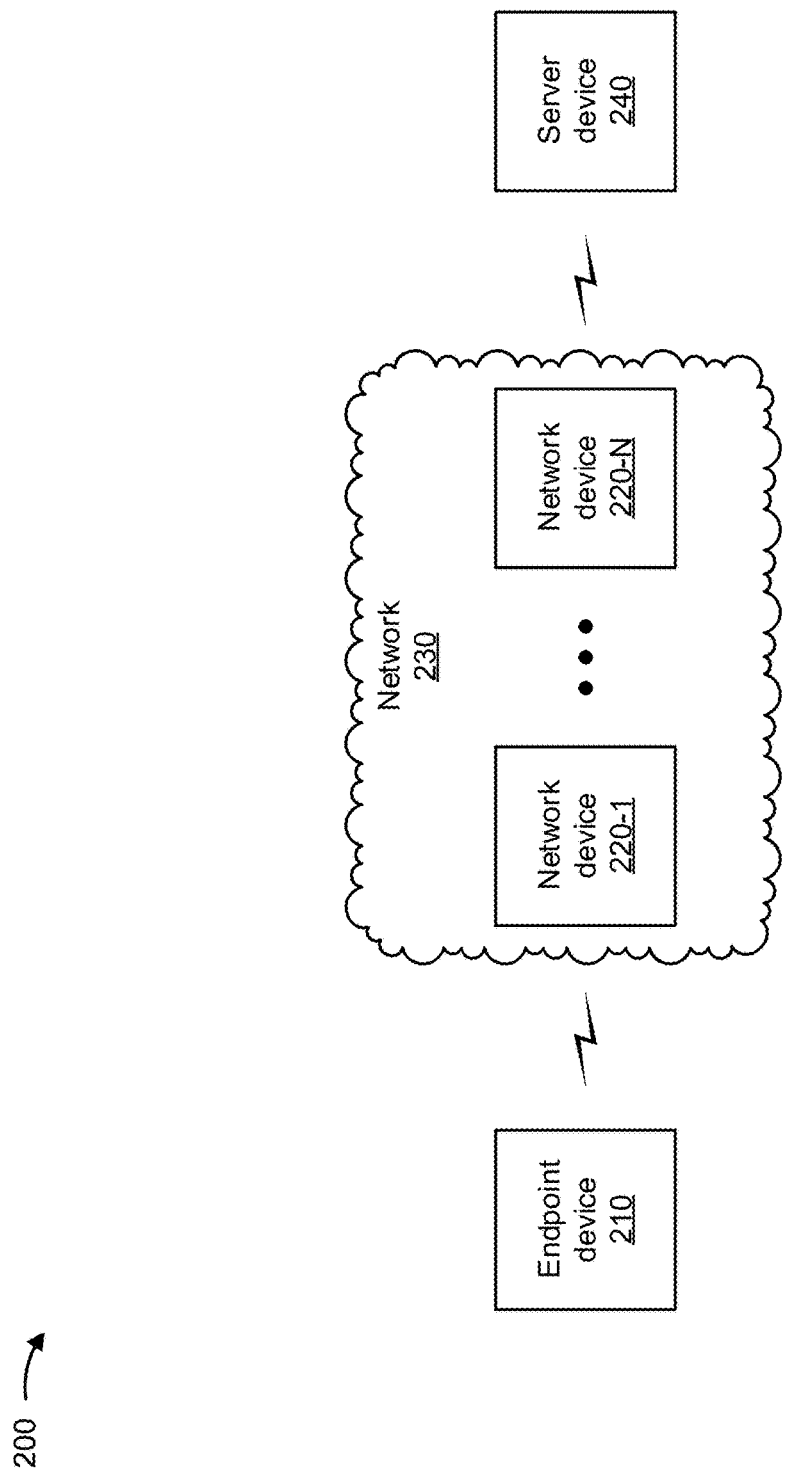
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an endpoint device 210, a group of network devices 220 (shown as network device 220-1 through network device 220-N), a network 230, and a server device 240. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), a network device, or a similar type of device. In some implementations, endpoint device 210 may receive network traffic from and/or may provide network traffic to other endpoint devices 210 and/or server device 240, via network 230 (e.g., by routing packets using network devices 220 as intermediaries).

Network device 220 includes one or more devices capable of receiving, processing, storing, routing, and/or providing traffic (e.g., a packet, other information or metadata, and/or the like) in a manner described herein. For example, network device 220 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 220 may include a gateway, a switch, a firewall, a hub, a bridge, a reverse proxy, a server (e.g., a proxy server, a cloud server, a data center server, and/or the like), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 230.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Server device 240 includes one or more devices capable of receiving, generating, storing, processing, and/or providing information, such as information described herein. For example, server device 240 may include a laptop computer, a tablet computer, a desktop computer, a group of server devices, or a similar type of device, associated with multicast traffic. In some implementations, server device 240 may receive information from and/or transmit information (e.g., multicast traffic) to endpoint device 210, via network 230 (e.g., by routing packets using network devices 220 as intermediaries).

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
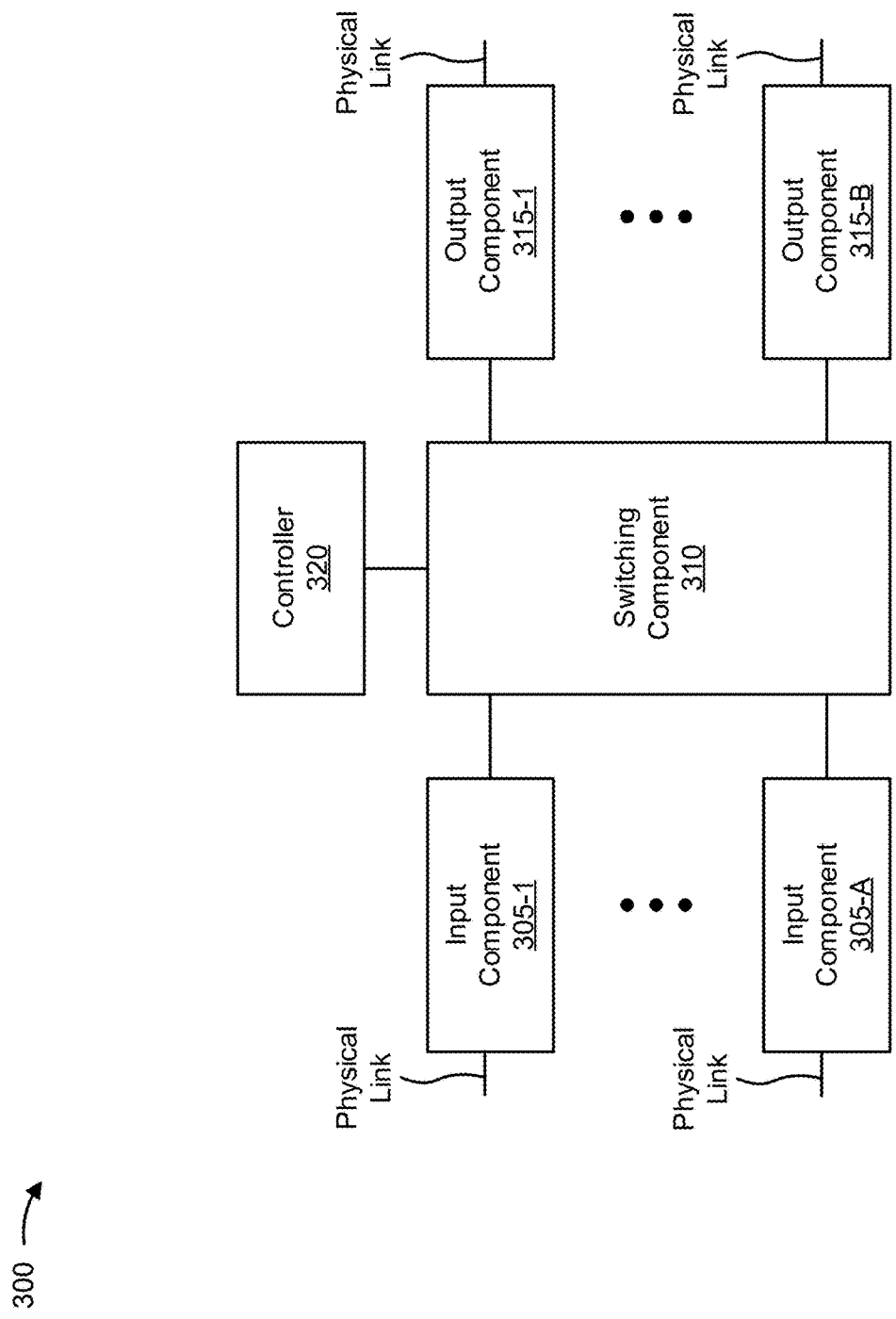
FIGS. 3 and 4 are diagram of example components of one or more devices of FIG. 2.

FIG. 3 is a diagram of example components of a device 300. Device 300 may correspond to network device 220. In some implementations, network device 220 may include one or more devices 300 and/or one or more components of device 300. As shown in FIG. 3, device 300 may include one or more input components 305-1 through 305-A (A≥1) (hereinafter referred to collectively as input components 305, and individually as input component 305), a switching component 310, one or more output components 315-1 through 315-B (B≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor or processing component. The processor is implemented in hardware, firmware, and/or a combination of software and hardware. In some implementations, controller 320 may include one or more processors that can be programmed to perform a function.

In some implementations, controller 320 may include a random-access memory (RAM), a read only memory (ROM), and/or another type of dynamic or static storage device (e.g., a flash memory, a magnetic memory, an optical memory, and/or the like) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets. In some cases, controller 320 may create a session table based on information determined while initializing a link fault detection session and may forward the session table to input components 305 and/or output components 315.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
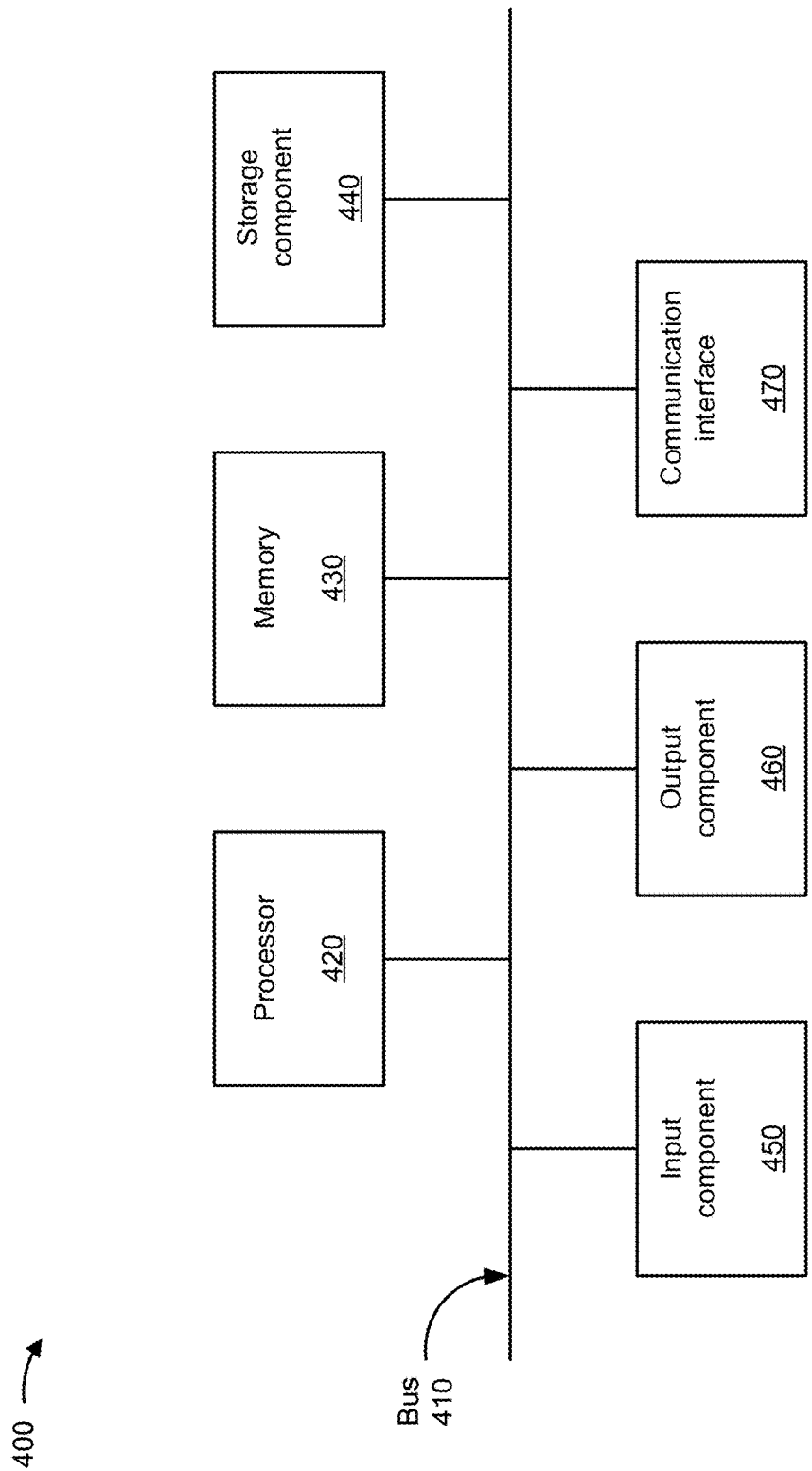

FIG. 4 is a diagram of example components of a device 400. Device 400 may correspond to endpoint device 210, network device 220, and/or server device 240. In some implementations, endpoint device 210, network device 220, and/or server device 240 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random-access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
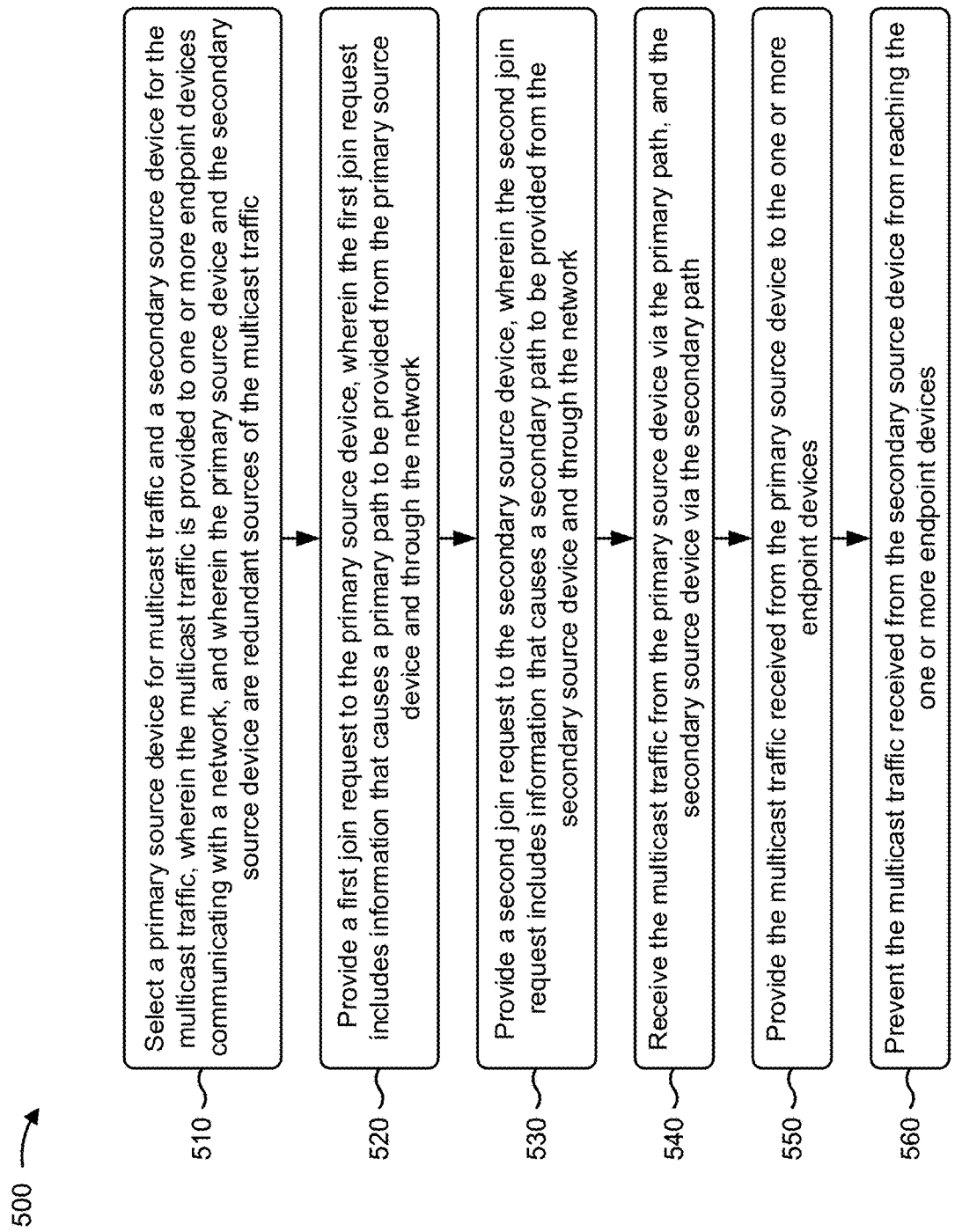
FIGS. 5-7 are flow charts of example processes for utilizing upstream routing of multicast traffic from redundant multicast sources to increase multicast resiliency and availability.

FIG. 5 is a flow chart of an example process 500 for utilizing upstream routing of multicast traffic from redundant multicast sources to increase multicast resiliency and availability. In some implementations, one or more process blocks of FIG. 5 may be performed by a network device (e.g., network device 220). In some implementations, one or more process blocks of FIG. 5 may be performed by another device or a group of devices separate from or including the network device, such as an endpoint device (e.g., endpoint device 210) and/or a server device (e.g., server device 240).

As shown in FIG. 5, process 500 may include selecting a primary source device for multicast traffic and a secondary source device for the multicast traffic, wherein the multicast traffic is provided to one or more endpoint devices communicating with a network, and wherein the primary source device and the secondary source device are redundant sources of the multicast traffic (block 510). For example, the network device (e.g., using switching component 310, controller 320, and/or the like) may select a primary source device for multicast traffic and a secondary source device for the multicast traffic, as described above in connection with FIGS. 1A-4. In some aspects, the multicast traffic may be provided to one or more endpoint devices communicating with the network. In some aspects, the primary source device and the secondary source device may be redundant sources of the multicast traffic.

As further shown in FIG. 5, process 500 may include providing a first join request to the primary source device, wherein the first join request includes information that causes a primary path to be provided from the primary source device and through the network (block 520). For example, the network device (e.g., using switching component 310, output component 315, controller 320, and/or the like) may provide a first join request to the primary source device, as described above in connection with FIGS. 1A-4. In some aspects, the first join request may include information that causes a primary path to be provided from the primary source device and through the network.

As further shown in FIG. 5, process 500 may include providing a second join request to the secondary source device, wherein the second join request includes information that causes a secondary path to be provided from the secondary source device and through the network (block 530). For example, the network device (e.g., using switching component 310, output component 315, controller 320, and/or the like) may provide a second join request to the secondary source device, as described above in connection with FIGS. 1A-4. In some aspects, the second join request may include information that causes a secondary path to be provided from the secondary source device and through the network.

As further shown in FIG. 5, process 500 may include receiving the multicast traffic from the primary source device via the primary path and the secondary source device via the secondary path (block 540). For example, the network device (e.g., using input component 305, switching component 310, controller 320, and/or the like) may receive the multicast traffic from the primary source device via the primary path and the secondary source device via the secondary path, as described above in connection with FIGS. 1A-4.

As further shown in FIG. 5, process 500 may include providing the multicast traffic received from the primary source device to the one or more endpoint devices (block 550). For example, the network device (e.g., using switching component 310, output component 315, controller 320, and/or the like) may provide the multicast traffic received from the primary source device to the one or more endpoint devices, as described above in connection with FIGS. 1A-4.

As further shown in FIG. 5, process 500 may include preventing the multicast traffic received from the secondary source device from reaching the one or more endpoint devices (block 560). For example, the network device (e.g., using input component 305, switching component 310, controller 320, and/or the like) may prevent the multicast traffic received from the secondary source device from reaching the one or more endpoint devices, as described above in connection with FIGS. 1A-4.

Process 500 may include additional implementations, such as any single implementation or any combination of implementations described below and/or in connection with one or more other processes described elsewhere herein.

In some implementations, the network device may monitor an operational status of the primary source device and may monitor an operational status of the secondary source device. In some implementations, when monitoring the operational status of the primary source device, the network device may utilize a keepalive protocol to monitor the operational status of the primary source device. In some implementations, when monitoring the operational status of the secondary source device, the network device may utilize the keepalive protocol to monitor the operational status of the secondary source device.

In some implementations, the network device may determine that the primary source device is non-operational based on an operational status of the primary source device, and may provide the multicast traffic received from the secondary source device to the one or more endpoint devices based on determining that the primary source device is non-operational.

In some implementations, the network device may determine that the primary source device is operational again based on the operational status of the primary source device and after providing the multicast traffic received from the secondary source device to the one or more endpoint devices, may prevent the multicast traffic received from the secondary source device from reaching the one or more endpoint devices based on determining that the primary source device is operational again, and may provide the multicast traffic received from the primary source device to the one or more endpoint devices based on determining that the primary source device is operational again.

In some implementations, the one or more endpoint devices may include a multicast group of endpoint devices that receive the multicast traffic. In some implementations, the network device may include a last hop network device before the one or more endpoint devices.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
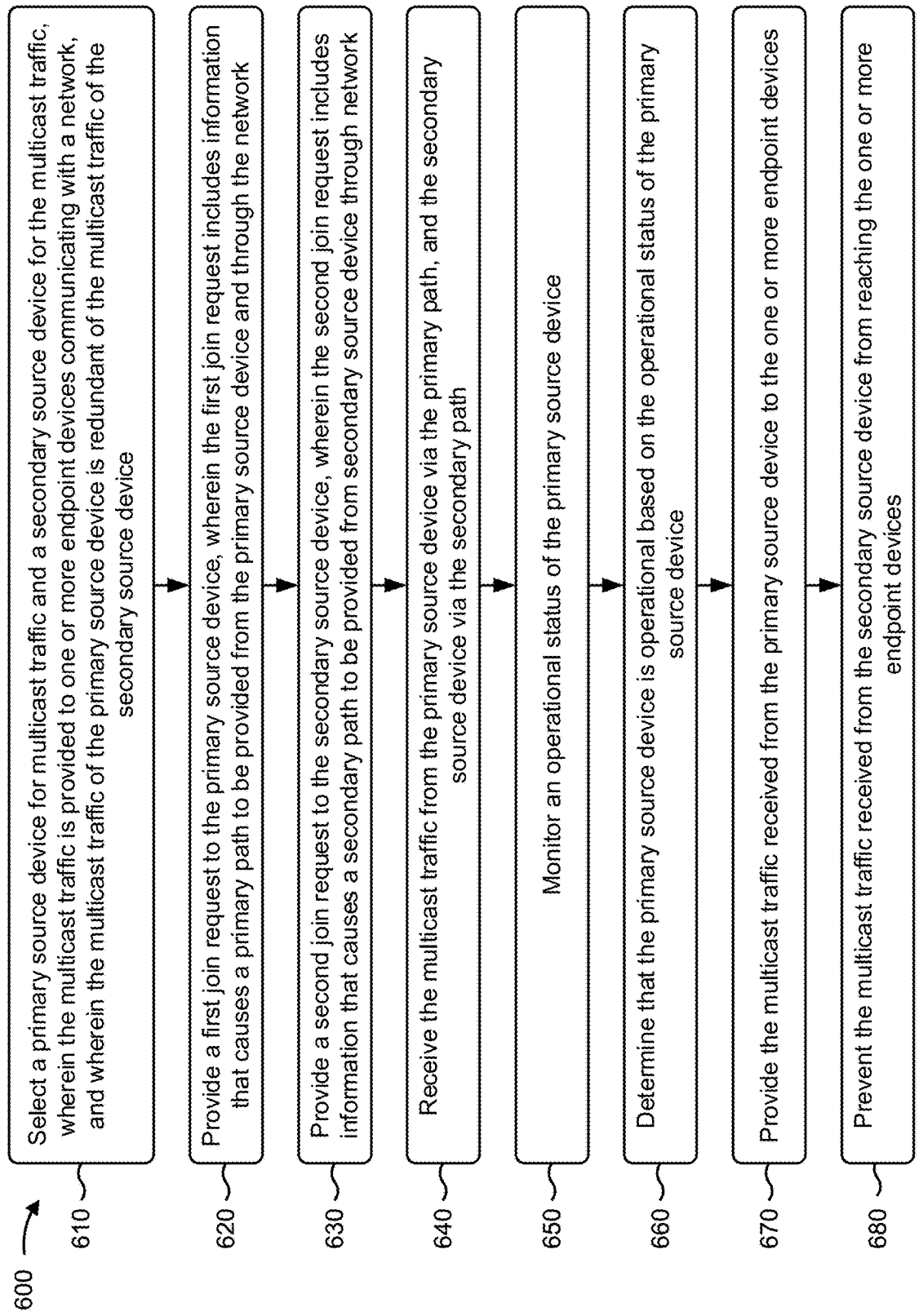

FIG. 6 is a flow chart of an example process 600 for utilizing upstream routing of multicast traffic from redundant multicast sources to increase multicast resiliency and availability. In some implementations, one or more process blocks of FIG. 6 may be performed by a network device (e.g., network device 220). In some implementations, one or more process blocks of FIG. 6 may be performed by another device or a group of devices separate from or including the network device, such as an endpoint device (e.g., endpoint device 210) and/or a server device (e.g., server device 240).

As shown in FIG. 6, process 600 may include selecting a primary source device for multicast traffic and a secondary source device for the multicast traffic, wherein the multicast traffic is provided to one or more endpoint devices communicating with a network, and wherein the multicast traffic of the primary source device is redundant of the multicast traffic of the secondary source device (block 610). For example, the network device (e.g., switching component 310, controller 320, and/or the like) may select a primary source device for multicast traffic and a secondary source device for the multicast traffic, as described above in connection with FIGS. 1A-4. In some aspects, the multicast traffic may be provided to one or more endpoint devices communicating with a network. In some aspects, the multicast traffic of the primary source device may be redundant of the multicast traffic of the secondary source device.

As further shown in FIG. 6, process 600 may include providing a first join request to the primary source device, wherein the first join request includes information that causes a primary path to be provided from the primary source device and through the network (block 620). For example, the network device (e.g., using switching component 310, output component 315, controller 320, and/or the like) may provide a first join request to the primary source device, as described above in connection with FIGS. 1A-4. In some aspects, the first join request may include information that causes a primary path to be provided from the primary source device and through the network.

As further shown in FIG. 6, process 600 may include providing a second join request to the secondary source device, wherein the second join request includes information that causes a secondary path to be provided from the secondary source device and through the network (block 630). For example, the network device (e.g., using switching component 310, output component 315, controller 320, and/or the like) may provide a second join request to the secondary source device, as described above in connection with FIGS. 1A-4. In some aspects, the second join request may include information that causes a secondary path to be provided from the secondary source device and through the network.

As further shown in FIG. 6, process 600 may include receiving the multicast traffic from the primary source device via the primary path and the secondary source device via the secondary path (block 640). For example, the network device (e.g., using input component 305, switching component 310, controller 320, and/or the like) may receive the multicast traffic from the primary source device via the primary path and the secondary source device via the secondary path, as described above in connection with FIGS. 1A-4.

As further shown in FIG. 6, process 600 may include monitoring an operational status of the primary source device (block 650). For example, the network device (e.g., using input component 305, switching component 310, output component 315, controller 320, and/or the like) may monitor an operational status of the primary source device, as described above in connection with FIGS. 1A-4.

As further shown in FIG. 6, process 600 may include determining that the primary source device is operational based on the operational status of the primary source device (block 660). For example, the network device (e.g., using switching component 310, controller 320, and/or the like) may determine that the primary source device is operational based on the operational status of the primary source device, as described above in connection with FIGS. 1A-4.

As further shown in FIG. 6, process 600 may include providing the multicast traffic received from the primary source device to the one or more endpoint devices (block 670). For example, the network device (e.g., using switching component 310, output component 315, controller 320, and/or the like) may provide the multicast traffic received from the primary source device to the one or more endpoint devices, as described above in connection with FIGS. 1A-4.

As further shown in FIG. 6, process 600 may include preventing the multicast traffic received from the secondary source device from reaching the one or more endpoint devices (block 680). For example, the network device (e.g., using input component 305, switching component 310, controller 320, and/or the like) may prevent the multicast traffic received from the secondary source device from reaching the one or more endpoint devices, as described above in connection with FIGS. 1A-4.

Process 600 may include additional implementations, such as any single implementation or any combination of implementations described below and/or in connection with one or more other processes described elsewhere herein.

In some implementations, the first join request may include a first Internet group management protocol (IGMP)/multicast listener discovery (MLD) source-specific join request, and the second join request may include a second IGMP/MLD source-specific join request. In some implementations, when selecting the primary source device for the multicast traffic and the secondary source device for the multicast traffic, the network device may assign priorities to a plurality of secondary source devices based on a preference metric and may select the secondary source device for the multicast traffic, from the plurality of secondary source devices, based on the priorities assigned to the plurality of secondary source devices.

In some implementations, the primary path may include a first source-specific shortest path from the primary source device to the network device, and the secondary path may include a second source-specific shortest path from the primary source device to the network device. In some implementations, when preventing the multicast traffic received from the secondary source device from reaching the one or more endpoint devices, the network device may program the secondary path with a particular reverse path forwarding (RPF) interface, may determine that the multicast traffic received from the secondary source device fails an RPF check based on the particular RPF interface, and may prevent the multicast traffic received from the secondary source device from reaching the one or more endpoint devices based on the multicast traffic received from the secondary source device failing the RPF check.

In some implementations, the network device may determine that the primary source device is non-operational based on the operational status of the primary source device, may reprogram the secondary path with an original RPF interface based on determining that the primary source device is non-operational, may determine that the multicast traffic received from the secondary source device passes the RPF check based on the original RPF interface, and may provide the multicast traffic received from the secondary source device to the one or more endpoint devices based on the multicast traffic received from the secondary source device passing the RPF check.

In some implementations, when preventing the multicast traffic received from the secondary source device from reaching the one or more endpoint devices, the network device may prevent the multicast traffic received from the secondary source device from reaching the one or more endpoint devices without utilizing filters in the network or the network device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
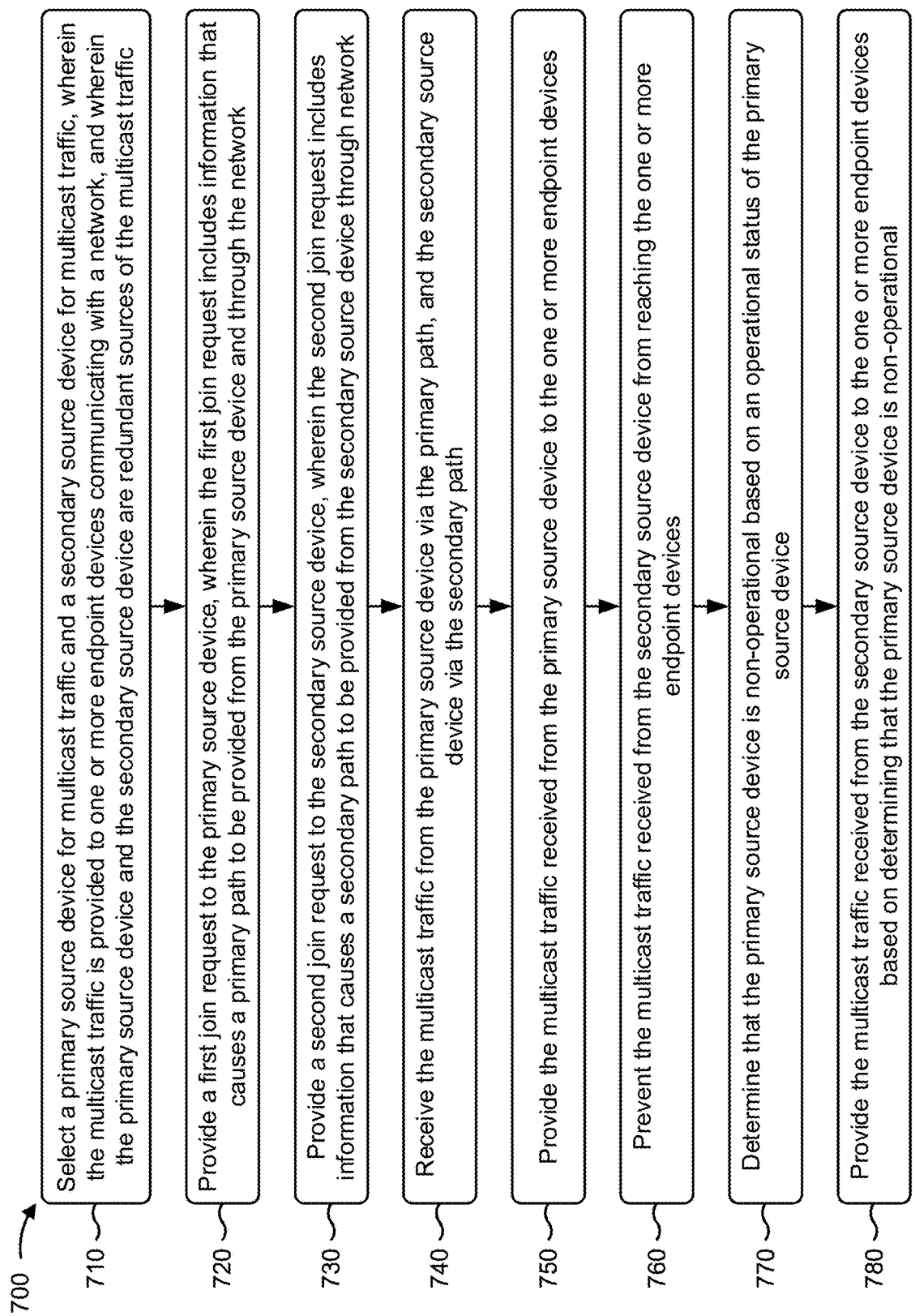

FIG. 7 is a flow chart of an example process 700 for utilizing upstream routing of multicast traffic from redundant multicast sources to increase multicast resiliency and availability. In some implementations, one or more process blocks of FIG. 7 may be performed by a network device (e.g., network device 220). In some implementations, one or more process blocks of FIG. 7 may be performed by another device or a group of devices separate from or including the network device, such as an endpoint device (e.g., endpoint device 210) and/or a server device (e.g., server device 240).

As shown in FIG. 7, process 700 may include selecting a primary source device for multicast traffic and a secondary source device for the multicast traffic, wherein the multicast traffic is provided to one or more endpoint devices communicating with a network, and wherein the primary source device and the secondary source device are redundant sources of the multicast traffic (block 710). For example, the network device (e.g., using switching component 310, controller 320, and/or the like) may select a primary source device for multicast traffic and a secondary source device for the multicast traffic, as described above in connection with FIGS. 1A-4. In some aspects, the multicast traffic may be provided to one or more endpoint devices communicating with a network. In some aspects, the primary source device and the secondary source device may be redundant sources of the multicast traffic.

As further shown in FIG. 7, process 700 may include providing a first join request to the primary source device, wherein the first join request includes information that causes a primary path to be provided from the primary source device and through the network (block 720). For example, the network device (e.g., using switching component 310, output component 315, controller 320, and/or the like) may provide a first join request to the primary source device, as described above in connection with FIGS. 1A-4. In some aspects, the first join request may include information that causes a primary path to be provided from the primary source device and through the network.

As further shown in FIG. 7, process 700 may include providing a second join request to the secondary source device, wherein the second join request includes information that causes a secondary path to be provided from the secondary source device and through the network (block 730). For example, the network device (e.g., using switching component 310, output component 315, controller 320, and/or the like) may provide a second join request to the secondary source device, as described above in connection with FIGS. 1A-4. In some aspects, the second join request may include information that causes a secondary path to be provided from the secondary source device and through the network.

As further shown in FIG. 7, process 700 may include receiving the multicast traffic from the primary source device via the primary path and from the secondary source device via the secondary path (block 740). For example, the network device (e.g., using input component 305, switching component 310, controller 320, and/or the like) may receive the multicast traffic from the primary source device via the primary path and from the secondary source device via the secondary path, as described above in connection with FIGS. 1A-4.

As further shown in FIG. 7, process 700 may include providing the multicast traffic received from the primary source device to the one or more endpoint devices (block 750). For example, the network device (e.g., using switching component 310, output component 315, controller 320, and/or the like) may provide the multicast traffic received from the primary source device to the one or more endpoint devices, as described above in connection with FIGS. 1A-4.

As further shown in FIG. 7, process 700 may include preventing the multicast traffic received from the secondary source device from reaching the one or more endpoint devices (block 760). For example, the network device (e.g., using input component 305, switching component 310, controller 320, and/or the like) may prevent the multicast traffic received from the secondary source device from reaching the one or more endpoint devices, as described above in connection with FIGS. 1A-4.

As further shown in FIG. 7, process 700 may include determining that the primary source device is non-operational based on an operational status of the primary source device (block 770). For example, the network device (e.g., using input component 305, switching component 310, controller 320, and/or the like) may determine that the primary source device is non-operational based on an operational status of the primary source device, as described above in connection with FIGS. 1A-4.

As further shown in FIG. 7, process 700 may include providing the multicast traffic received from the secondary source device to the one or more endpoint devices based on determining that the primary source device is non-operational (block 780). For example, the network device (e.g., using switching component 310, output component 315, controller 320, and/or the like) may provide the multicast traffic received from the secondary source device to the one or more endpoint devices based on determining that the primary source device is non-operational, as described above in connection with FIGS. 1A-4.

Process 700 may include additional implementations, such as any single implementation or any combination of implementations described below and/or in connection with one or more other processes described elsewhere herein.

In some implementations, when providing the first join request to the primary source device, the network device may provide the first join request to the primary source device via a protocol independent multicast source-specific mode (PIM-SSM), and when providing the second join request to the secondary source device, the network device may provide the second join request to the secondary source device via the PIM-SSM.

In some implementations, the network device may determine that the primary source device is operational again based on the operational status of the primary source device, and after providing the multicast traffic received from the secondary source device to the one or more endpoint devices, may prevent the multicast traffic received from the secondary source device from reaching the one or more endpoint devices based on determining that the primary source device is operational again, and may provide the multicast traffic received from the primary source device to the one or more endpoint devices based on determining that the primary source device is operational again.

In some implementations, the network device may utilize a keepalive protocol to monitor an operational status of the primary source device and may utilize the keepalive protocol to monitor an operational status of the secondary source device.

In some implementations, when selecting the primary source device for the multicast traffic and the secondary source device for the multicast traffic, the network device may assign priorities to a plurality of secondary source devices based on a preference metric and may select the second source device for the multicast traffic, from the plurality of secondary source devices, based on the priorities assigned to the plurality of secondary source devices.

In some implementations, when preventing the multicast traffic received from the secondary source device from reaching the one or more endpoint devices, the network device may program the secondary path with a particular reverse path forwarding (RPF) interface, may determine that the multicast traffic received from the secondary source device fails an RPF check based on the particular RPF interface, and may prevent the multicast traffic received from the secondary source device from reaching the one or more endpoint devices based on the multicast traffic received from the secondary source device failing the RPF check.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   selecting, by a network device of a network, a primary source device for multicast traffic and a secondary source device for the multicast traffic,
      wherein the multicast traffic is provided to one or more endpoint devices communicating with the network, and
      wherein the primary source device and the secondary source device are redundant sources of the multicast traffic;
   providing, by the network device, a first join request to the primary source device,
      wherein the first join request includes information that causes a primary path to be provided from the primary source device and through the network;
   providing, by the network device, a second join request to the secondary source device, wherein the second join request includes information that causes a secondary path to be provided from the secondary source device and through the network;
receiving, by the network device, the multicast traffic from:
the primary source device via the primary path, and
the secondary source device via the secondary path;
providing, by the network device, the multicast traffic received from the primary source device to the one or more endpoint devices;
preventing, by the network device, the multicast traffic received from the secondary source device from reaching the one or more endpoint devices;
determining, by the network device, that the primary source device is non-operational based on an operational status of the primary source device;
providing, by the network device, the multicast traffic received from the secondary source device to the one or more endpoint devices based on determining that the primary source device is non-operational;
determining, by the network device, that the primary source device is operational again based on the operational status of the primary source device and after providing the multicast traffic received from the secondary source device to the one or more endpoint devices;
preventing, by the network device, the multicast traffic received from the secondary source device from reaching the one or more endpoint devices based on determining that the primary source device is operational again; and
providing, by the network device, the multicast traffic received from the primary source device to the one or more endpoint devices based on determining that the primary source device is operational again.

2. The method of claim 1, further comprising:
monitoring the operational status of the primary source device; and
monitoring the operational status of the secondary source device.

3. The method of claim 2, wherein monitoring the operational status of the primary source device comprises:
utilizing a keepalive protocol to monitor the operational status of the primary source device, and
wherein monitoring the operational status of the secondary source device comprises:
utilizing the keepalive protocol to monitor the operational status of the secondary source device.

4. The method of claim 1, wherein the one or more endpoint devices include a multicast group of endpoint devices that receive the multicast traffic.

5. The method of claim 1, wherein the network device includes a last hop network device before the one or more endpoint devices.

6. A network device, comprising:
one or more memories; and
one or more processors, communicatively coupled to the one or more memories, to:
select a primary source device for multicast traffic and a secondary source device for the multicast traffic,
wherein the multicast traffic is provided to one or more endpoint devices communicating with a network,
wherein the multicast traffic of the primary source device is redundant of the multicast traffic of the secondary source device, and
wherein the one or more processors, when selecting the primary source device for the multicast traffic and the secondary source device for the multicast traffic, are to:
assign priorities to a plurality of secondary source devices based on a preference metric, and
select the secondary source device for the multicast traffic, from the plurality of secondary source devices, based on the priorities assigned to the plurality of secondary source devices;
provide a first join request to the primary source device,
wherein the first join request includes information that causes a primary path to be provided from the primary source device and through the network;
provide a second join request to the secondary source device,
wherein the second join request includes information that causes a secondary path to be provided from the secondary source device and through the network;
receive the multicast traffic from:
the primary source device via the primary path, and
the secondary source device via the secondary path;
monitor an operational status of the primary source device;
determine that the primary source device is operational based on the operational status of the primary source device;
provide the multicast traffic received from the primary source device to the one or more endpoint devices; and
prevent the multicast traffic received from the secondary source device from reaching the one or more endpoint devices.

7. The network device of claim 6, wherein:
the first join request includes a first Internet group management protocol (IGMP)/multicast listener discovery (MLD) source-specific join request, and
the second join request includes a second IGMP/MLD source-specific join request.

8. The network device of claim 6, wherein:
the primary path includes a first source-specific shortest path from the primary source device to the network device, and
the secondary path includes a second source-specific shortest path from the secondary source device to the network device.

9. The network device of claim 6, wherein the one or more processors, when preventing the multicast traffic received from the secondary source device from reaching the one or more endpoint devices, are to:
program the secondary path with a particular reverse path forwarding (RPF) interface;
determine that the multicast traffic received from the secondary source device fails an RPF check based on the particular RPF interface; and
prevent the multicast traffic received from the secondary source device from reaching the one or more endpoint devices based on the multicast traffic received from the secondary source device failing the RPF check.

10. The network device of claim 9, wherein the one or more processors are further to:
determine that the primary source device is non-operational based on the operational status of the primary source device;

reprogram the secondary path with an original RPF interface based on determining that the primary source device is non-operational;
determine that the multicast traffic received from the secondary source device passes the RPF check based on the original RPF interface; and
provide the multicast traffic received from the secondary source device to the one or more endpoint devices based on the multicast traffic received from the secondary source device passing the RPF check.

11. The network device of claim 6, wherein the one or more processors, when preventing the multicast traffic received from the secondary source device from reaching the one or more endpoint devices, are to:
prevent the multicast traffic received from the secondary source device from reaching the one or more endpoint devices without utilizing filters in the network or the network device.

12. A non-transitory computer-readable medium storing instructions, the instructions comprising:
one or more instructions that, when executed by one or more processors, cause the one or more processors to:
select a primary source device for multicast traffic and a secondary source device for the multicast traffic,
wherein the multicast traffic is provided to one or more endpoint devices communicating with a network, and
wherein the primary source device and the secondary source device are redundant sources of the multicast traffic;
provide a first join request to the primary source device,
wherein the first join request includes information that causes a primary path to be provided from the primary source device and through the network;
provide a second join request to the secondary source device,
wherein the second join request includes information that causes a secondary path to be provided from the secondary source device and through the network;
receive the multicast traffic from:
the primary source device via the primary path, and
the secondary source device via the secondary path;
provide the multicast traffic received from the primary source device to the one or more endpoint devices;
prevent the multicast traffic received from the secondary source device from reaching the one or more endpoint devices,
wherein the one or more instructions, that cause the one or more processors to prevent the multicast traffic received from the secondary source device from reaching the one or more endpoint devices, cause the one or more processors to:
program the secondary path with a particular reverse path forwarding (RPF) interface,
determine that the multicast traffic received from the secondary source device fails an RPF check based on the particular RPF interface, and
prevent the multicast traffic received from the secondary source device from reaching the one or more endpoint devices based on the multicast traffic received from the secondary source device failing the RPF check;
determine that the primary source device is non-operational based on an operational status of the primary source device; and
provide the multicast traffic received from the secondary source device to the one or more endpoint devices based on determining that the primary source device is non-operational.

13. The non-transitory computer-readable medium of claim 12, wherein the one or more instructions, that cause the one or more processors to provide the first join request to the primary source device, cause the one or more processors to:
provide the first join request to the primary source device via a protocol independent multicast source-specific mode (PIM-SSM), and
wherein the one or more processors, when providing the second join request to the secondary source device, are to:
provide the second join request to the secondary source device via the PIM-SSM.

14. The non-transitory computer-readable medium of claim 12, wherein the instructions further comprise:
one or more instructions that, when executed by the one or more processors, cause the one or more processors to:
determine that the primary source device is operational again based on the operational status of the primary source device and after providing the multicast traffic received from the secondary source device to the one or more endpoint devices;
prevent the multicast traffic received from the secondary source device from reaching the one or more endpoint devices based on determining that the primary source device is operational again; and
provide the multicast traffic received from the primary source device to the one or more endpoint devices based on determining that the primary source device is operational again.

15. The non-transitory computer-readable medium of claim 12, wherein the instructions further comprise:
one or more instructions that, when executed by the one or more processors, cause the one or more processors to:
utilize a keepalive protocol to monitor an operational status of the primary source device; and
utilize the keepalive protocol to monitor an operational status of the secondary source device.

16. The non-transitory computer-readable medium of claim 12, wherein the one or more instructions, that cause the one or more processors to select the primary source device for the multicast traffic and the secondary source device for the multicast traffic, cause the one or more processors to:
assign priorities to a plurality of secondary source devices based on a preference metric; and
select the second source device for the multicast traffic, from the plurality of secondary source devices, based on the priorities assigned to the plurality of secondary source devices.

17. The method of claim 1, further comprising:
monitoring the operational status of the primary source device utilizing a bidirectional forwarding detection (BFD) keepalive protocol.

18. The method of claim 1, further comprising:
monitoring the operational status of the primary source device utilizing an interior gateway protocol (IGP) keepalive protocol.

19. The network device of claim 6, wherein, when monitoring the operational status of the primary source device, the one or more processors are to:

monitor the operational status of the primary source device utilizing one or more of:
a bidirectional forwarding detection (BFD) keepalive protocol,
an interior gateway protocol (IGP) keepalive protocol, or
monitoring statistics for the multicast traffic; and
wherein the one or more processors are further to:
monitor the operational status of the secondary source device utilizing one or more of:
the BFD keepalive protocol,
the IGP keepalive protocol, or
the monitoring statistics for the multicast traffic.

20. The non-transitory computer-readable medium of claim 12, wherein the instructions further comprise:
one or more instructions that, when executed by the one or more processors, cause the one or more processors to:
monitor the operational status of the primary source device utilizing one or more of:
a bidirectional forwarding detection (BFD) keepalive protocol,
an interior gateway protocol (IGP) keepalive protocol, or
monitoring statistics for the multicast traffic; and
monitor the operational status of the secondary source device utilizing one or more of:
the BFD keepalive protocol,
the IGP keepalive protocol, or
the monitoring statistics for the multicast traffic.

* * * * *